US009376530B2

(12) United States Patent
Hess et al.

(10) Patent No.: US 9,376,530 B2
(45) Date of Patent: Jun. 28, 2016

(54) METHOD FOR THE PRODUCTION OF ALIPHATIC POLYESTERS

(71) Applicant: UHDE INVENTA-FISCHER GMBH, Berlin (DE)

(72) Inventors: Christopher Hess, Schönflies (DE); Hans Staudenmayer, Berlin (DE)

(73) Assignee: Uhde Inventa-Fischer GmbH, Berlin (DE)

( * ) Notice: Subject to any disclaimer, the term of this patent is extended or adjusted under 35 U.S.C. 154(b) by 0 days.

(21) Appl. No.: 14/364,748

(22) PCT Filed: Dec. 10, 2012

(86) PCT No.: PCT/EP2012/074888
§ 371 (c)(1),
(2) Date: Jun. 12, 2014

(87) PCT Pub. No.: WO2013/087547
PCT Pub. Date: Jun. 20, 2013

(65) Prior Publication Data
US 2015/0065678 A1    Mar. 5, 2015

(30) Foreign Application Priority Data

Dec. 13, 2011 (EP) .................................... 11009828

(51) Int. Cl.
*C08G 63/85* (2006.01)
*C08G 63/80* (2006.01)

(52) U.S. Cl.
CPC ................ *C08G 63/85* (2013.01); *C08G 63/80* (2013.01)

(58) Field of Classification Search
CPC ....................................................... C08L 67/02
See application file for complete search history.

(56) References Cited

U.S. PATENT DOCUMENTS

| 2,012,267 | A  | 8/1935  | Carothers |
| 2,071,250 | A  | 2/1937  | Carothers |
| 6,399,716 | B2 | 6/2002  | Chung et al. |
| 7,115,701 | B2 | 10/2006 | Schultz Van Endert et al. |
| 7,259,227 | B2 | 8/2007  | Schulz Van Endert et al. |
| 8,110,149 | B2 | 2/2012  | Schulz Van Endert |
| 8,252,888 | B2 | 8/2012  | Van Endert |
| 8,344,093 | B2 | 1/2013  | Matsuzono et al. |
| 2001/0004665 | A1 | 6/2001 | Chung et al. |
| 2005/0163679 | A1 | 7/2005 | Schulz Van Endert et al. |
| 2006/0155099 | A1 | 7/2006 | Wu et al. |
| 2007/0066790 | A1 | 3/2007 | Schulz Van Endert et al. |
| 2009/0117013 | A1 | 5/2009 | Schulz Van Endert |
| 2010/0305297 | A1 | 12/2010 | Hoshino et al. |
| 2011/0028678 | A1 | 2/2011 | Matsuzono et al. |
| 2012/0136132 | A1 | 5/2012 | Schulz Van Endert |

FOREIGN PATENT DOCUMENTS

| CN | 101910245 A     | 12/2010 |
| CN | 101977963 A     | 2/2011  |
| EP | 1 882 712 A1    | 1/2008  |
| EP | 1 448 658 B1    | 3/2008  |
| EP | 2 228 399   *   | 12/2008 |
| EP | 2 228 399 A1    | 9/2010  |
| JP | 2010-202770 A   | 9/2010  |
| JP | 2010-254812 A   | 11/2010 |
| WO | WO 2007/140925 A1 | 12/2007 |
| WO | WO 2010/123095 A1 | 10/2010 |

OTHER PUBLICATIONS

European Patent Office, International Preliminary Report on Patentability in International Application No. PCT/EP2012/074888 (Jun. 26, 2014).
Carothers, "Polymerization," *Chemical Reviews* 8, pp. 353-401 (1931).
European Patent Office, International Search Report in International Application No. PCT/EP2012/074888 (Apr. 24, 2013).
State Intellectual Property Office of the People's Republic of China, First Office Action in Chinese Patent Application No. 201280061316.0 (Mar. 30, 2015).

\* cited by examiner

*Primary Examiner* — Kuo-Liang Peng
(74) *Attorney, Agent, or Firm* — Leydig, Voit & Mayer, Ltd.

(57) ABSTRACT

The present invention relates to a method for the production of aliphatic polyesters in a two-step method. There are thereby added, in a first step, to a precondensate of an aliphatic dicarboxylic acid or to a mixture of aliphatic dicarboxylic acids and an aliphatic dialcohol or to a mixture of aliphatic dialcohols, further monomeric components, i.e. further aliphatic dicarboxylic acids and also a further aliphatic dialcohol, a polyester prepolymer being obtained. In a further step, polycondensation of the prepolymer obtained in the first step is effected.

18 Claims, No Drawings

METHOD FOR THE PRODUCTION OF ALIPHATIC POLYESTERS

CROSS-REFERENCE TO RELATED APPLICATIONS

This patent application is the U.S. national phase of International Application No. PCT/EP2012/074888, filed on Dec. 10, 2012, which claims the benefit of European Patent Application No. 11009828.2, filed Dec. 13, 2011, the disclosures of which are incorporated by reference.

The present invention relates to a method for the production of aliphatic polyesters in a two-step method. In a first step, to a precondensate of an aliphatic dicarboxylic acid or to a mixture of aliphatic dicarboxylic acids and an aliphatic dialcohol or to a mixture of aliphatic dialcohols, further monomeric components, i.e. further aliphatic dicarboxylic acids and further aliphatic dialcohol are added, whereby a polyester prepolymer is obtained. In a further step, polycondensation of the prepolymer obtained in the first step is effected.

Basically, the production of aliphatic polyesters from the most varied of starting raw materials has already been known since the nineteen thirties. In particular in publications by W. H. Carothers (inter alia Chem. Reviews 8 (1931) 353-401) or in corresponding patents (U.S. Pat. No. 2,012,267 or U.S. Pat. No. 2,071,250), inter alia the production of polyethylene succinate, polypropylene succinate or polyhexamethylene succinate is described.

An example of an aliphatic polyester produced according to this method is polybutylene succinate (PBS), polybutylene succinic acid, CAS#110-15-6). This hereby concerns a thermoplastic polymer with a melting point of approx. 118° C. PBS can be produced for example by polycondensation of succinic acid and 1,4-butanediol (BDO). As biopolymer, PBS is biodegradable and can be disposed of for example on industrial composting plants. In addition, PBS is available partially or entirely from renewable raw materials.

For example, the following methods for the production of PBS are known from the state of the art:

a) Succinic acid and butanediol are weighed precisely and directly introduced and heated together. With distillation of water, the precondensate, which is subsequently polycondensed, is produced. It is hereby disadvantageous that the methods can normally be implemented only in batch polycondensation plants.

b) A previously produced precondensate is introduced and succinic acid and butanediol are added. During heating of the mixture, the precondensate melts and a reaction medium is produced in which in particular the succinic acid dissolves well and can be made to react therein advantageously with the butanediol.

c) From patents of the company Hitachi, introduction of a precondensate and addition of a paste is known. Firstly a paste (pasty mixture/suspension of solid, crystalline succinic acid and butanediol) is thereby produced by metering and mixing of the raw materials. The thus produced paste must be agitated constantly and, until addition to the reaction or addition to a precondensate, for example also a circulation line must be maintained in order that the composition thereof (molar ratio) does not change as a result of the sedimentation of succinic acid or the separation of butanediol.

US 2006/0155099 A1 discloses a method for the production of a biodegradable copolyester in which firstly an aromatic dicarboxylic compound is made to react with a first aliphatic glycol, the hereby resulting aromatic prepolymer is converted with a second aromatic dicarboxylic compound and a second aliphatic glycol in order to obtain a first reaction product; subsequently, in a further step, this first reaction product is converted with an aliphatic dicarboxylic component in order to obtain a second reaction product. Finally, a polycondensation of the second reaction product is effected. US 2006/0155099 A1 hence describes in particular a continuous method for the production of a biodegradable copolyester, however the procedure proposed there not being able to be transferred to a production method of aliphatic polyesters or copolyesters.

From U.S. Pat. No. 6,399,716 B2, a method for the production of a partially aromatic copolyester is known, in which an aliphatic prepolymer is produced, in a first step, and, in a second step, is converted with an aromatic dicarboxylic acid and an aliphatic glycol. Finally, a two-stage polycondensation of the reaction products produced in the first two steps is effected. The monomeric components are thereby fed immediately to form the prepolymer.

EP 1 882 712 A1 relates to a polyester obtained from biomass and describes in particular the construction thereof and also a method for the production of this biomass-based polyester.

From US 2010/0305297 A1, a method for the production of copolyesters is known, in which the educts are fed into a precondensation step and esterified there. The obtained esterification products are finally polycondensed in multiple successive steps.

From JP 2010-254812 A and also from JP 2010-202770 A, a method for the production of PBS or a device for the production of PBS is known, in which, in a first step, a slurry of the starting substances, i.e. succinic acid and 1,4-butanediol, is converted to form an oligomer and the obtained oligomer is subsequently constructed by polycondensation to form the polyester. It is hereby disadvantageous that the slurry of the educts which is used leads to sedimentation of the succinic acid contained in the slurry, as a result of which the process becomes very sensitive to disruption and high-maintenance since possibly succinic acid deposits must be removed from the apparatus which is used.

It is the object of the present invention to indicate a method with which, in a simple and economical manner, polyesters or copolyesters, in particular PBS, can be produced.

This object is achieved by the features of the method for the production of aliphatic polyesters described herein, and the advantageous developments thereof.

According to the invention, a method for the production of a polyester or copolyester is hence indicated, in which a) at least one aliphatic dicarboxylic acid with 2 to 12 carbon atoms and/or acid anhydrides derived herefrom and at least one aliphatic alcohol with 2 to 12 carbon atoms and at least two hydroxyl functionalities are mixed together and the dicarboxylic acid is dissolved in the dialcohol by means of a suitable temperature increase, b) the solution obtained in step a) is added to an esterification product which comprises at least one diester and/or at least one an oligoester that was obtained from at least one aliphatic dicarboxylic acid with at least one aliphatic alcohol, and made to react there, The aliphatic dicarboxylic acids, used according to the invention, with 2 to 12 carbon atoms can thereby represent linear or branched aliphatic dicarboxylic acids. Likewise, acid anhydrides derived from the aliphatic dicarboxylic acids can be used. The acid anhydrides can thereby represent for example cyclic or mixed acid anhydrides. Likewise, a mixture of the mentioned aliphatic dicarboxylic acids and the derived acid anhydrides is conceivable. In addition, it is possible that the aliphatic dicarboxylic acids or the acid anhydrides derived therefrom are used as pure substance, it is also possible that more than one aliphatic dicarboxylic acid is used, for example as mixture of a plurality of dicarboxylic acids.

The aliphatic alcohol, used according to the invention, with 2-12 carbon atoms can thereby likewise have a linear or branched aliphatic basic body. Preferably, the aliphatic alcohol is a glycol, i.e. has two hydroxyfunctionalities. The hydroxyfunctionalities are thereby preferably primary or secondary, in particular primary, hydroxyfunctionalities.

The esterification product used according to the invention in step b) can comprise a diester or an oligoester, in which the diester or the oligoester represents the condensation product of at least one aliphatic dicarboxylic acid with at least one aliphatic alcohol. In the case of the diester, both carboxyl groups of the aliphatic dicarboxylic acid are thereby esterified with an aliphatic alcohol. In the case where the esterification product in step b) comprises an oligoester, it is necessary that the aliphatic alcohol used for the esterification has at least two hydroxy functionalities. The oligoester hence represents a condensation product of an aliphatic dicarboxylic acid and an aliphatic alcohol with at least two hydroxy functionalities, preferably two hydroxy functionalities, which has at least two repetition units. Preferably, the oligoester has less than 50 repetition units.

The method according to the invention hence starts not exclusively from monomeric components, i.e. for example a dicarboxylic acid and a diol, but rather in fact uses an esterification product which is converted with a mixture or, ideally, a solution of the corresponding dicarboxylic acids and diols. According to the invention, there is understood by an esterification product, a substance or a substance mixture which comprises at least one diester from the previously mentioned monomeric components, i.e. dicarboxylic acid and diol. In addition, the esterification product can however also comprise further components, such as for example monoesters of dicarboxylic acid and of the dialcohol or oligomers of the dicarboxylic acid and the dialcohol.

The subsequent polycondensation or copolycondensation (step c)) can thereby be effected such that the reaction product obtained in step b) is supplied, without addition of further components, to a single or multistep polycondensation reaction.

However, the addition of further monomers and/or oligomers used already in steps a) and/or b) is likewise possible. The same monomers or oligomers can hereby be used so that a homopolymer is produced but also monomers deviating herefrom can be used so that copolymers are produced.

Also other monomers, such as e.g. aromatic diols, aromatic dicarboxylic acids or chain extenders based on isocyanates etc., can be added in the polycondensation step.

The essential advantage of the method according to the invention resides in the fact that, by using the esterification product and also using a solution of the aliphatic dicarboxylic acid in an aliphatic diol, a faster and complete reaction of the supplied raw materials with each other is made possible. As a result, a substantial increase in efficiency of the method according to the invention can be achieved.

Further advantages of the method according to the invention are thereby:

- No "unstable" paste but rather a homogeneous solution is used: the solution is "stable in storage", i.e. no more sedimentation of the dicarboxylic acid used, e.g. succinic acid, occurs.
- "Unground" succinic acid can be used. Commercially available succinic acid is frequently coarsely crystalline and must, in order that an extensively sedimentation-stable and problem-free conveyable paste can be produced, firstly be ground. This is a further process step which requires energy. In addition, omission of this process step effectively prevents emergence of irritating succinic acid dusts.
- A circulation line is not required (see JP 2010202,770 or other commercial plants, e.g. in PET production.
- "Simpler" pumps can be used since purely liquid metering is involved; paste pumps are frequently critical in the technique, the conveying precision must be weighed up against blockage of the pump. In the case of too small gap dimensions, blockage of the pump is frequently observed, upon stoppage of the pump conveyance, also blockages of the baking dicarboxylic acids.
- The warm/hot butanediol, as is reobtained from the sump of the process column, can be reused without all too complex cooling, which results in a saving in energy. In addition, butanediol is frequently heated before addition into the paste batch container to a sufficiently high temperature, e.g. by means of barrel heaters, in order that it can be conveyed at all (melting point approx. 20° C.). Also this hence already preheated butanediol is thus advantageous in the sense of the application. Only a smaller temperature difference up to dissolving temperature must still be applied for the dicarboxylic acid.
- By using a solution, the heat exchanger surfaces can be kept smaller in the esterification step or these can be operated with a lower heating power. As a result, a more effective design of the first reaction step (esterification) is possible since less energy input is required than for heating a paste to reaction temperature (typically >160° C.).
- Surprisingly, the polyesters or copolyesters produced thus according to the method according to the invention have a substantially higher final viscosity, compared with polyesters or copolyesters produced in a different way.
- A comparable procedure cannot be implemented in the PET, PBT process since terephthalic acid does not dissolve in alcohols/dialcohols.

PBS can be produced in a 2-stage reaction from succinic acid and butanediol. In principle, the method is identical to the production of PBT (instead of succinic acid, terephthalic acid is used there) or PET (terephthalic acid and also ethylene glycol as raw materials).

The invention is illustrated in more detail subsequently, by way of example, with the illustrated reaction diagrams.

Production of the Esterification Product:
e.g. the esterification of succinic acid with butanediol:

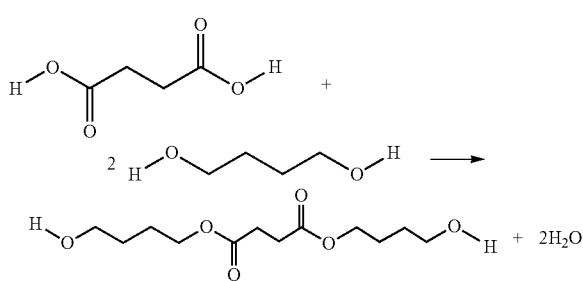

In the stoichiometric conversion of one mol succinic acid with two mol butanediol (BDO), the intermediate product bis-hydroxybutylene succinate is produced. In reality however, a broad spectrum of oligomers and monomers and also the remains of non-converted or only partially converted succinic acid is obtained.

Normally, the reaction conditions used hereby are:

| | |
|---|---|
| Temperature: | 140-250° C. |
| Pressure: | atmospheric or slightly low/or high pressure |
| Molar ratio: | BDO/succinic acid = 1.0-2.5:1.0 |
| Catalyst: | In order to reduce the byproduct formation catalysts can already be added, e.g. Ti- or Sn-based, for esterification of the succinic acid. |

Primarily the condensation product is water produced as byproduct. Said water can be distilled off out of the reaction mixture via a column. Traces of entrained BDO can thereby likewise be separated and preferably be supplied again for esterification. In addition, there is produced in a subsidiary reaction in a low quantity of BDO, by cycle-forming ether formation with water separation, tetrahydrofuran THF (in particular as a function of the temperature, excess of BDO and possibly also catalyst (type, quantity), which can likewise be separated.

According to U.S. Pat. No. 6,399,716 esterification conditions >240° are regarded as critical for aliphatic prepolymers since decomposition reactions, such as decarboxylation (separation of $CO_2$) hereby occur. At temperatures <160° C., the removal of water from the reaction mixture is difficult. The range 1:1.3 to 1:1.4 is regarded as ideal molar ratio. With a ratio of <1:15, the reactivity decreases and the colour becomes brownish. In the case of a molar ratio >1:2.0, the production costs increase greatly.

Diagram of the polycondensation of bis-hydroxybutylene succinate to form PBS:

The esterification product thereby preferably represents the reaction medium.

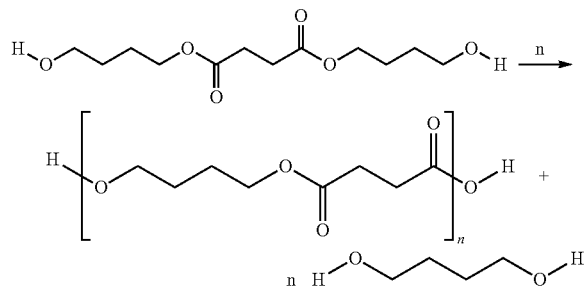

Normally, the reaction conditions hereby used are:

| | |
|---|---|
| Temperature: | 200-250° C. |
| Pressure: | 0.1-100 mbar |
| Catalyst | Ti- or Sn-based. |

Byproducts:

During the polycondensation of the bis-hydroxybutylene succinate, the condensation product butanediol is produced, which can be introduced again into the process, inter alia for production of the solution of the aliphatic dicarboxylic acid after corresponding purification. In addition, BDO which is still free or split off as condensation product can be converted to form THF, all the more, the higher the temperature of the polycondensation. The THF must be separated from the BDO and purified and, with corresponding purity, can be sold as a valuable product. Furthermore, the formation of linear ethers from butanediol (comparable to the formation of DEG from EG) and also the formation of succinic acid anhydride by water separation from succinic acid cannot be excluded.

Raw Materials for the PBS Production:

The raw materials used according to the invention, i.e. the aliphatic dicarboxylic acids with 2 to 12 carbon atoms or acid anhydrides derived herefrom and also the aliphatic alcohols with 2 to 12 carbon atoms and at least 2 hydroxyl functionalities, can be prepared in principle petrochemically, however frequently also biochemically. In particular succinic acid (but also other dicarboxylic acids) and also butanediol (and further diols) can be obtained from renewable raw materials; these educts produced on the basis of renewable raw materials are likewise suitable as materials which can be used in the method according to the invention.

In addition, further additives, possibly also reactive additives, can be added to the individual reaction steps, in particular at step c). In particular, chain extenders, comonomers, catalysts, similar polymers and also further additives are suitable, which are explained subsequently by way of example.

Chain Extenders

It is known from various patents and passages in literature that PBS frequently only obtains its final properties (polymer with sufficiently high molar masses for further processing) after a chain extending step (inter alia aliphatic diisocyanates or diphenylcarbonate, bisoxazolines). Generally, the biodegradability decreases with the use of chain extenders. Diisocyanates involve in addition the problem that carcinogenic diamines can be produced during the decomposition. When using diphenylcarbonate, toxic phenol is produced as condensation product. If chain extenders, which have not reacted or only partially remain in the product, they likewise involve health risks, e.g. by being released during further processing. However even without the use of chain extenders, high molar masses can be achieved in the polycondensation. It should be explained explicitly that it is the object of this application to do without CEs—nevertheless it is possible with a prepolymer produced according to the claims.

Comonomers

It is known from various patents and passages in literature that PBS is frequently provided with comonomers in order to improve its properties. Comonomers can hereby be for example branching components, such as e.g. multivalent carboxylic acids (propane tricarboxylic acid, pyromellitic acid, or acid anhydrides and also multivalent alcohols (glycerine, trimethalolpropane, pentaerythritol etc.). In particular, the chain branchings are intended to improve the processing properties, e.g. in the case of film blowing. In order to prevent a gel formation, the proportion of branching components should be <1% by mol.

Additives

It is known from various patents that additives (e.g. phosphorus-containing stabilisers, such as phosphoric acid or phosphorous acid) are added during the production of PBS. It emerges from U.S. Pat. No. 6,399,716 that, with a content of <0.02% by weight of stabiliser, the colour of the product becomes yellow/brown whilst, with a content >2% by weight, the reaction progress is inadequate. In addition, a series of further additives can be added, such as e.g. heat stabilisers, antioxidants, nucleation agents, flameproofing agents, antistatic agents, processing aids, UV stabilisers and also reinforcing materials or fillers.

Catalysts

In general, the common catalysts (Lewis acids) which are suitable for polycondensation can be used. Particularly suitable are various Ti- or Zr catalysts, furthermore also Ge, Sn, V, Mo, Al etc. and also mixtures. High concentrations of catalysts are frequently required in order to achieve corresponding space/time yields. On the other hand, high catalyst concentrations are discussed critically, in connection with colouration and also with a low hydrolysis stability of the obtained polymers. If "strong acids" are used for the catalysis of the polycondensation reaction (sulphonic acids, phosphoric acid etc.), an increased hydrolysis susceptibility and also an increased THF formation rate are regarded here also as critical.

Similar Polymers

The starting material for this class of PBS polymers is C4-dicarboxylic acid (succinic acid). This can be produced well in the meantime by means of biochemical methods. The most important product of this class is PBS (polybutylene succinate, from succinic acid and 1,4-butanediol). In addition, there are succinates in which a part of the succinic acid is replaced by adipic acid (PBSA) or by terephthalic acid (PBST) or in which a part of the 1,4-butanediol is replaced by ethylene glycol (PEBS). Furthermore, further polyesters are conceivable in which the alcohol components are replaced completely by ethylene glycol (polyethylene succinate, PES), 1,3-propanediol (polypropylene succinate, PPS) or 1,6-hexanediol (polyhexylene succinate, PHS). Comparable to the series of polyamides, the melting points of the polysuccinic acid esters generally decrease with longer chain lengths of the diols. Thus, for example PES has a melting point of 100° C., PBS of 118° C. and PHS of 52° C. For PBST, melting points of 138 to 180° C. (50-70% proportion of terephthalic acid) are reported.

Properties of PBS

PBS is distinguished by the following properties:
insolubility in water, alcohol, acetone, ether etc.,
good barrier properties relative to oxygen,
adequate barrier effect for many applications against water vapour and alcohol,
good mechanical properties, adequate stability,
wide processing window in injection moulding, extrusion and fibre production,
biodegradability.

PBS can be processed well alone or also together with other biodegradable polymers on standard injection moulding machines (160-200° C.).

In principle, the property level of PBS is comparable to that of PP or films made of HDPE or even to polystyrene. PPB has been used to date for foodstuff packaging, agricultural aids (plant pots, films for mulch etc.), medicinal applications, cosmetics and also automobile parts or as hard foam for packaging applications. In a melt-spinning process, fibres can be produced from PBS. It is known in addition that, for improved processability, e.g. in film-blowing processes, comonomers and also in particular branching components are incorporated in the macromolecular structure of the PBS. Frequently, also for improving the properties and in particular for reducing the price, blends of PBS with other polymers are used, e.g. polyadipates, or starch. In principle, PBS can be used in many applications in which previously PET and PP were used.

In particular the fact that PBS can be produced entirely from renewable raw materials ("green", "sustainable") and can be used readily as a film in the foodstuff packaging sector, should be mentioned as advantages.

A preferred embodiment of the method according to the invention provides that the solution in step a) is produced at temperatures of 50° C. to 250° C., preferably between 100° C. to 180° C. For further preference, the aliphatic dicarboxylic acid is thereby dissolved in the aliphatic alcohol with agitation. For example, the corresponding alcohol can be introduced in liquid form at the mentioned temperatures and the aliphatic dicarboxylic acid can be dissolved therein. However, it is likewise possible to introduce the dicarboxylic acid and, by addition of the alcohol and mechanical agitation, for example stirring, to produce a corresponding homogeneous solution.

A further preferred embodiment of the method according to the invention provides that the esterification product comprises the diester at at least 10% by weight, preferably of 20 to 98% by weight, further preferred of 40 to 95% by weight, particularly preferred of 60 to 90% by weight.

As defined above already, the diester should thereby be understood as condensation product of an aliphatic dicarboxylic acid with at least one aliphatic alcohol. Preferably, the diester (and possibly likewise the oligoester) is thereby derived from the same aliphatic dicarboxylic acids and aliphatic alcohols, as are used in step a) of the method according to the invention.

Furthermore, it is preferred if the esterification product which, as mentioned above already, can represent a mixture of different raw materials, comprises, in addition to the diester, oligomers from the at least one dicarboxylic acid and the at least one alcohol with on average 2 to 10, preferably 3 to 6, repetition units.

Alternatively and likewise preferred, it is however likewise possible to use, as esterification product, the above-mentioned diester as pure substance.

In a further preferred embodiment, in step a), the stoichiometric ratio of the totality of the at least one aliphatic dicarboxylic acid with 2 to 12 carbon atoms and/or acid anhydrides derived herefrom to the totality of the at least one aliphatic alcohol with 2 to 12 carbon atoms is of 1:0.5 to 1:5.0, preferably of 1:0.9 to 1:3.0, particularly preferred 1:1.1 to 1:2.0.

In a further advantageous embodiment of the method according to the invention, the weight ratio of the esterification product to the totality of the supplied solution of at least one aliphatic dicarboxylic acid with 2 to 12 carbon atoms and/or acid anhydrides derived herefrom in the at least one aliphatic alcohol with 2 to 12 carbon atoms, is of 1:0.5 to 1:20, preferably of 1:1 to 1:5.

Preferred reaction temperatures which are maintained during step b) are thereby between 120 and 300° C., preferably between 160 and 250° C.

In order to increase the yield, preferably during step b) and/or subsequent to step b), byproducts which are present in vaporous form under normal conditions from 60° C. or at higher temperatures, in particular water and also tetrahydrofuran, are removed at least partially or entirely for example by distillation.

Step c) can thereby be configured as a single polycondensation step. In particular, it is advantageous if the poly- or the copolycondensation step c) is implemented in two steps. The poly- or the copolycondensation step is thereby divided into two steps, a first step $c_1$) and a step $c_2$), the reaction product obtained from step b) being fed into the first step $c_1$). By means of polycondensation reaction or copolycondensation reaction, the reaction product obtained from step b) is thereby converted into a polyester prepolymer or copolyester prepolymer. In the second step $c_2$) of the poly- or copolycondensation step c), the product produced from step $c_1$) is converted by polycondensation reaction or copolycondensation reaction into the polyester or copolyester.

With increasing reaction progress through the two steps $c_1$) and $c_2$), the reaction mixture passing through the steps is preferably supplied with reducing pressures and increasing temperatures.

In particular it is thereby advantageous if step $c_1$) is implemented at a reduced pressure relative to normal conditions, preferably at a pressure of 5 mbar to 900 mbar, further preferred of 10 mbar to 700 mbar, in particular of 30 mbar to 300 mbar. The temperature in step c1 is thereby preferably between 160 and 300° C., further preferred between 200 and 260° C. and particularly preferred between 230 and 250° C.

Alternatively or additionally hereto, it is possible that step $c_2$) is implemented at temperatures of 200 and 300° C., preferably of 220 to 270° C. and particularly preferred between 230 and 260° C. Step c2 is implemented at reduced pressure relative to normal pressure, preferably at a pressure of 0.1 mbar to 30 mbar, further preferred of 0.2 mbar to 10 mbar, in particular of 0.4 mbar to 5 mbar.

Furthermore, also one or more polycondensation steps can follow the previously described step $c_2$).

Furthermore, it is preferred that a catalyst is added during the method according to the invention.

In particular, it is thereby of advantage if, before and/or during implementation of step b) and/or c), at least one catalyst, preferably a heavy metal-free catalyst, particularly preferred a titanium-containing catalyst, in particular titanium alcoholates, and/or titanium salts derived from organic acids, such as e.g. titanium oxalate, titanium citrate and/or titanium lactate, or antimony acetate, is added to the reaction mixture present in the respective step.

The catalyst can thereby be added e.g. during step b). It is likewise possible that the catalyst is added during step c), e.g. also respectively in steps $c_1$) and/or $c_2$). Furthermore, it is possible that the catalyst is added even before the first step, this can be effected for example during the production of the esterification product, which is dealt with in more detail subsequently. In addition, it is possible that the total quantity of catalyst is distributed to the various steps. It is particularly preferred thereby for example if catalyst is supplied during the production of the esterification product and during step b). A further addition of catalyst can be effected during step c).

There can be added, as particularly preferred titanium alcoholate catalyst, for example titanium tetrabutylate (TiTB) or bis-titanium-[tetra(hydroxypropyl)ethylene diamine] (see subsequent formula) which is marketed with the trade name "LAC 2000".

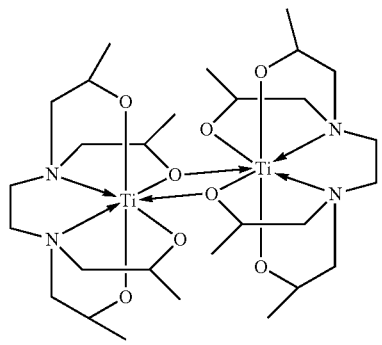

A further preferred catalyst is thereby antimony acetate.

Preferred quantity concentrations in which the catalyst or catalysts are added to the respective reaction mixture are thereby, e.g. in step b), 10 to 20,000 ppm, preferably 100 to 5,000 ppm. The weight details thereby relate respectively to the originally used weight sum of all of the aliphatic dicarboxylic acids, aliphatic alcohols and esterification product. The indicated weight quantity of the added catalyst is thereby the total quantity of catalyst which is fed in during the entire method. Should therefore the catalyst be fed in, distributed over a plurality of steps (for example in the case where step c) is implemented in a plurality of steps), the total weight quantities of the fed-in quantity of catalyst are added to the previously mentioned weight quantities. Should the catalyst be added even before step a), for example in the step in which the esterification product is produced, the quantity of dicarboxylic acids or dialcohols to be used later is used in fact jointly for calculation of the quantity concentration of the catalyst. Preferred catalyst quantities which can be fed in step c) can thereby be, e.g. step c), in a quantity concentration of 10 to 20,000 ppm, preferably of 100 to 5,000 ppm, relative to the reaction product obtained from step b).

A further preferred embodiment of the method according to the invention provides that, before and/or during implementation of step c), at least one cocatalyst and/or at least one stabiliser is added to the prepolymer.

In the case where the polycondensation step c) is implemented in a plurality of steps, for example as described above, in the form of a precondensation step $c_1$) and a main condensation step $c_2$), the addition of the cocatalyst and/or of the stabiliser can be effected in each of these steps $c_1$) and $c_2$); it is also likewise possible that the addition of cocatalyst and/or of the at least one stabiliser is effected in only one of the two steps. It is likewise possible that the cocatalyst is added in one step and the stabiliser in another.

Preferably, the at least one aliphatic dicarboxylic acid is selected from the group consisting of succinic acid, oxalic acid, malonic acid, glutaric acid, adipic acid, pimelic acid, suberic acid, azelaic acid, sebacic acid, undecanoic acid, dodecanoic acid, 3,3-dimethylpentanedioic acid, anhydrides thereof and/or mixtures hereof, particularly preferred is succinic acid.

It is likewise advantageous if the at least one alcohol is selected from the group consisting of ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol and/or combinations or mixtures hereof 1,4-butanediol is particularly preferred.

According to the method according to the invention, one of the previously mentioned preferred dicarboxylic acids can thereby be converted with one of the previously mentioned preferred dialcohols.

However, it is likewise possible that a combination of two or more of the previously mentioned dicarboxylic acids is converted with merely one or even a plurality of the previously mentioned dialcohols. On the other hand, also an individual dicarboxylic acid can be made to react with a plurality of the previously mentioned dialcohols to be used advantageously according to the method according to the invention.

In a further preferred embodiment,
a) the reaction product produced in step b) is adjusted to an intrinsic viscosity (I.V.) of 0.04 to 0.12, preferably of 0.05 to 0.10, particularly preferred of 0.06 to 0.08 and/or
b) the polyester produced in step c), in particular that in step $c_2$), is adjusted to an intrinsic viscosity (I.V.) of 0.6 to 2.0, preferably of 0.8 to 1.6, particularly preferred of 1.0 to 1.4.

The I.V. determination is thereby effected in the following way: firstly determination of the throughflow time t of a solution of the sample in the solvent chloroform in a concentration c of 1.0 g/dl is effected by means of a viscosimeter of the Ubbelohde type (capillary 0c according to DIN 51562) at a temperature of 20° C. The relative solution viscosity $\eta_{rel}$ is calculated therefrom from the ratio of the throughflow time t to the throughflow time t0 of the pure solvent in the identical viscosimeter likewise at 20° C.:

$$\eta_{rel} = t/t_0$$

From the relative solution viscosity, calculation of the I.V. or intrinsic viscosity $\eta_{intr}$ can be effected according to the calculation formula according to Solomon-Ciuta:

$$\eta_{intr} = \frac{1}{c}\sqrt{2 \cdot (\eta_{rel} - 1 - \ln\eta_{rel})}$$

the concentration c of the solution being indicated with 1.0 g/dl for this purpose.

It is particularly preferred if PBS, i.e. the polycondensate from succinic acid and butanediol, is produced with the method according to the invention. In this respect, the diester preferably contained in the esterification product is bis(4-hydroxybutyl)butanedioate.

Alternatively and likewise preferably, polyethylene succinate can be produced with the method according to the invention. In this respect, succinic acid is hereby used as dicarboxylic acid and ethylene glycol as dialcohol. The diester contained in the esterification product is thereby bis(4-hydroxyethyl)butanedioate.

The previously mentioned succinic acid can thereby be produced based on crude oil, however it is likewise possible that succinic acid based on renewable raw materials is used or a mixture of succinic acid based on crude oil and based on renewable raw materials is used.

The esterification product used according to the invention in step b) can be produced preferably by condensation of the at least one aliphatic dicarboxylic acid and acid anhydrides derived therefrom with 2 to 12 carbon atoms with the at least one aliphatic alcohol with 2 to 12 carbon atoms and at least two hydroxyl functionalities.

It is hereby of advantage if the condensation of the esterification product is effected immediately before implementation of step b) and/or in parallel and simultaneously to step a).

A further preferred embodiment provides that, in the production of the esterification product, the stoichiometric ratio of the totality of the at least one dicarboxylic acid with 2 to 12 carbon atoms and/or acid anhydrides derived herefrom to the totality of the at least one aliphatic alcohol with 2 to 12 carbon atoms is of 1:0.5 to 1:5.0, preferably of 1:0.9 to 1:3.0, particularly preferred 1:1.1 to 1:2.0.

The present invention is explained in more detail with reference to the subsequent embodiments and examples without restricting the invention to the special parameters represented there.

In the subsequent tests, 4 different methods of esterifying a paste or a solution of succinic acid and BDO (molar ratio 1:1.5 SAC/BDO) to form a monomer/esterification product were tested. It was thereby intended to be tested which parameters deliver the best results. Examined thereby are the effects which the addition of the paste or solution have on the intrinsic viscosity of the end product. All other conditions (quantities, type of monomer present, temperature etc.) and also in particular the quantity of added catalyst were to be kept equal.

The following tests were implemented:

a) Direct esterification of succinic acid with BDO without introducing esterification product (T1) corresponding to the state of the art with batchwise production of aliphatic polyesters.

b) Esterification, all the paste being introduced together with the esterification product (T2).

c) Esterification, the paste being supplied slowly to the esterification product as a suspension (T3)—according to the previous state of the art in the continuous production of aliphatic polyesters.

Esterification, the paste being added in drops to the esterification product present as a solution (T4)—according to the present patent application.

For test b), c) and d), a previously produced esterification product was used (molar ratio 1:1.3; 406 ppm Ti; I.V.=0.071 dl/g, unconverted carboxyl end groups=23.8 mmol/kg). For this purpose, 270 g of a previously produced esterification product (approx. 375 ppm Ti, I.V.=0.06 dl/g) with 4.65 g LAC 2000 was introduced into a 5 l stainless steel reactor. The reactor was heated by means of an oil bath (190° C.). After an internal temperature of 166° C. had been reached ($t_0$), 945 g succinic acid and 937 g BDO (molar ratio 1:1.3) were added slowly as paste over a time period of approx. 4-5 h. Via the column operated at 100° C., the vapours were separated and the distilled-over water was collected. 7 hours after beginning the addition of paste, the esterification product (T0) was released from the reaction vessel into a trough and cooled.

Of this esterification product T0, now respectively 50 g (T1:0 g) and also approx. 490 mg of the catalyst LAC 2000 were introduced into a 500 ml three-neck flask with a column and reflux cooler set thereon. In T2, in fact the total quantity of paste (94.5 g SAC and 108.1 g BDO (molar ratio 1:1.5) was introduced together with the esterification product and the catalyst. At a temperature of 190° C., the flask with the reaction mixture/educts was lowered into the preheated heating medium with N2 passage and the agitator was started. To the introduced monomer, in T3 and T4, now 94.5 g SAC and 108.1 g BDO (molar ratio 1:1.5) were slowly introduced as paste or solution over a time period of 120 min. For T3, the paste was supplied at room temperature)(25° from a receiving flask by means of a peristaltic pump, for T4, the succinic acid had been dissolved in advance at 120° C. with agitation and was added in drops subsequently from a drop funnel temperature-controlled at 100° C. Via the column operated at 100° C., the resulting vapours were separated and the distilled-over water was collected after cooling. 6.5 h after lowering the flask into the heating bath, the subsequent esterification products were obtained.

| Test | Introduced E product | BS [g] | BDO [g] | MR | Cat. | Quantity Cat. [mg] |
|---|---|---|---|---|---|---|
| T1 | 0 g | 94.5 | 108.1 | 1:1.5 | LAC2000 | 491 |
| T2 | 50 g (T0) | 94.5 | 108.1 | 1:1.5 | LAC2000 | 491 |
| T3 | 50 g (T0) | 94.5 | 108.1 | 1:1.3 | LAC2000 | 491 |
| T4 | 50 g (T0) | 94.5 | 108.1 | 1:1.5 | LAC2000 | 491 |

| Test | H$_2$O (distilled-over) [ml] | Yield [%] H$_2$O | Unconverted carboxyl groups [mmol/kg] | I.V. [dl/g] | Yield [%] E product |
|---|---|---|---|---|---|
| T1 | 25.5 | 88.5 | 17.6 | 0.072 | 97.8 |
| T2 | 23.5 | 81.1 | 5.9 | 0.088 | 98.8 |
| T3 | 25.5 | 88.5 | 15.1 | 0.080 | 92.0 |
| T4 | 25 | 86.8 | 25 | 0.070 | 97.9 |

Abbreviations:
BS = succinic acid
BDO = 1,4-butanediol
MV = mixing ratio (mol/mol)
CAT. = catalyst
I.V. = intrinsic viscosity For the subsequent polycondensation reactions, respectively approx. 60 g of any of the previously produced esterification product was added into respectively a laboratory glass polycondensation apparatus. After reaching a temperature of 190° C., the apparatus with the esterification product was lowered into a heating bath with N2 passage. Approx. 15 minutes later, the agitator was switched on and vacuum applied and the pressure was decreased slowly and also the control temperature for the heating bath was increased to 230° C. A further 15 minutes later, the final vacuum of approx. 0.5-1.5 mbar was reached and maintained. Six hours after beginning to apply the vacuum, nitrogen was added to the apparatus and the samples were obtained.

| Test | COOH [mmol/kg] | I.V. [dl/g] |
|---|---|---|
| T1 | 0.5 | 0.759 |
| T2 | 2.8 | 0.817 |
| T3 | 2.0 | 1.317 |
| T4 | 5.2 | 1.617 |

In the tests, it was able to be shown that the introduction of esterification product in the production of an esterification product which subsequently was very suitable for reaching high molar masses later, in the case of PBS, is advantageous. Without introduction of esterification product (T1 according to a) in contrast only the lowest molar mass with PBS was reached in the subsequent polycondensation.

A good molar mass for the PBS is achieved if, during production of the esterification product, a mixture of succinic acid with butanediol has been introduced already together with the esterification product (T2 according to b)). The result was even better if the paste was added slowly as a suspension to the introduced esterification product (T3 according to c)). However, this procedure was even surpassed by the addition of "paste" in dissolved form (T4 according to d))—and hence corresponding to the procedure according to the invention.

The present invention was likewise already achieved in a subsequently described technical test.

In a pilot plant (construction according to the Uhde Inventa-Fischer patent applications EP 1 448 658 or WO 2007/140925), a solution of succinic acid in butanediol was produced by firstly 534 kg butanediol (preheated to 130° C., addition from a storage tank heated to 130° C.) being added to a paste mixing container preheated to 120° C. Subsequently, now 400 kg succinic acid was added to the BDO, uniformly and with agitation over a period of time of 2 hours. After a further 2 hours, the succinic acid was completely dissolved and the solution was released into a paste receiving container preheated to 120° C. From there, the solution of succinic acid in butanediol was supplied continuously to an esterification reactor by means of a metering pump. Herein, esterification product is found in a natural circulation, the mixture, emerging from the heat exchanger, of succinic acid dissolved in BDO with esterification product being adjusted to a temperature of 220° C. The esterification was operated at a pressure of 1,000 mbar. The catalyst present in liquid state at room temperature was metered into the esterification step so that a content of 350 ppm active Ti is achieved in the end product. The addition and removal of esterification product are controlled such that an average dwell time of 2 hours results in the esterification step. The water occurring during the esterification is withdrawn via the top and supplied to a separation column. Therein, water and the azeotrope of water and the THF resulting as byproduct are separated from jointly distilled-over butanediol. The butanediol removed in the sump of the column is cooled to a temperature of 130° C. and supplied to the heated butanediol storage tank. The esterification product removed at the sump of the esterification step is transferred by means of a melt pump into the post-esterification step. The inflow and outflow into the post-esterification is controlled such that an average dwell time of 90 minutes is maintained in the post-esterification step. The temperature in the post-esterification step is 230° C., a pressure of 500 mbar prevails. The product removed at the sump of the post-esterification step is transferred by means of a melt pump into the prepolymerisation step (step c1). The inflow and outflow into the prepolymerisation step is controlled such that an average dwell time of 120 minutes is maintained in the prepolymerisation step. The temperature in the prepolymerisation step is thereby 240° C., a pressure of 15 mbar prevails. The prepolymer removed at the sump of the prepolymerisation step is transferred by means of a melt pump into the polycondensation reactor (step c2). The inflow and outflow into the polycondensation reactor is controlled such that an average dwell time of 90 minutes is maintained during the polycondensation. The temperature in the polycondensation step is thereby 240° C., a pressure of 1.5 mbar prevails. The vapours of butanediol, resulting during the polycondensation, residues of water and THF are likewise supplied to the separation columns. The configuration of the polycondensation reactor thereby corresponds to the UIF patent application . . . . Via the melt pump fitted at the outlet of the polycondensation reactor, the melt is supplied to an underwater granulation unit at a flow of 40 kg/h. After the centrifuging-off of water, PBS granulate with an I.V. value of 1.10 dl/g and a colour value b* of 7 is obtained.

The invention claimed is:

1. A method for the production of a polyester or copolyester, in which
   a) at least one aliphatic dicarboxylic acid with 2 to 12 carbon atoms and/or acid anhydrides derived therefrom and at least one aliphatic alcohol with 2 to 12 carbon atoms and at least two hydroxyl functionalities are mixed together to produce a solution, wherein the solution is produced at a temperature of 100° C. to 250° C.,
   b) the solution obtained in step a) is added to an esterification product which comprises at least one diester and/or at least one an oligoester that was obtained from at least one aliphatic dicarboxylic acid with at least one aliphatic alcohol, and made to react there,
   and
   c) the reaction product obtained from step b) is polycondensed or copolycondensed at reduced pressure relative to normal conditions.

2. The method according to claim 1, wherein the solution in step a) is produced at a temperature of 100° C. to 180° C.

3. The method according to claim 1, wherein the esterification product comprises the diester in an amount of at least 10% by weight.

4. The method according to claim 1, wherein the esterification product comprises, in addition to the diester, oligomers from the at least one dicarboxylic acid and the at least one alcohol with on average 2 to 10 repetition units.

5. The method according to claim 1, wherein, in step a), the stoichiometric ratio of the totality of the at least one aliphatic dicarboxylic acid with 2 to 12 carbon atoms and/or acid anhydrides derived therefrom to the totality of the at least one aliphatic alcohol with 2 to 12 carbon atoms is of 1:0.5 to 1:5.0.

6. The method according to claim 1, wherein the weight ratio of the esterification product to the totality of the supplied solution of at least one aliphatic dicarboxylic acid with 2 to 12 carbon atoms and/or acid anhydrides derived therefrom in the at least one aliphatic alcohol with 2 to 12 carbon atoms and at least two hydroxy functionalities, is of 1:0.5 to 1:20.

7. The method according to claim 1, wherein the reaction in step b) is implemented at a temperature of 120 to 300° C.

8. The method according to claim 1, wherein, during step b) and/or subsequent to step b), byproducts which are present in vaporous form under normal conditions from 60° C. or at higher temperatures are removed at least partially or entirely.

9. The method according to claim 1, wherein the poly- or copolycondensation step c) is implemented in two steps, wherein in a first step $c_1$) a polyester prepolymer or copolyester prepolymer is produced from the reaction product obtained from step b) by polycondensation or copolycondensation and, in a subsequent step $c_2$), the polyester or copolyester is obtained from the polyester prepolymer or copolyester prepolymer from step $c_1$) by polycondensation or copolycondensation.

10. The method according to claim 9, wherein
  a) Step $c_1$)
    i. is implemented at reduced pressure relative to normal conditions,
    and/or
    ii. at a temperature of 160 to 300° C., and/or
  b) Step $c_2$)
    i. is implemented at reduced pressure relative to normal conditions,
    and/or
    ii. at a temperature of 200 to 300° C.

11. The method according to claim 1, wherein, before and/or during implementation of step b) and/or c), at least one catalyst, is added to the reaction mixture present in the respective step.

12. The method according to claim 11, wherein the catalyst
  a) in step b), is added in a quantity concentration of 10 to 20,000 ppm relative to the weight sum of aliphatic dicarboxylic acid, aliphatic alcohol and esterification product and/or
  b) in step c), is added in a quantity concentration of 10 to 20,000 ppm relative to the reaction product obtained from step b).

13. The method according to claim 1, wherein, before and/or during implementation of step c), at least one cocatalyst and/or at least one stabiliser is added to the reaction mixture.

14. The method according to claim 1, wherein
  a) the at least one aliphatic dicarboxylic acid is selected from the group consisting of succinic acid, oxalic acid, malonic acid, glutaric acid, adipic acid, pimelic acid, suberic acid, azelaic acid, sebacic acid, undecanoic acid, dodecanoic acid, 3,3-dimethylpentanedioic acid, anhydrides thereof and/or mixtures thereof, and
  b) the at least one alcohol is selected from the group consisting of ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol and/or combinations or mixtures thereof.

15. The method according to claim 1, wherein
  a) the reaction product produced in step b) is adjusted to an intrinsic viscosity (I.V.) of 0.04 to 0.12 and/or
  b) the polyester produced in step c), in particular that in step $c_2$), is adjusted to an intrinsic viscosity (I.V.) of 0.60 to 2.0.

16. The method according to claim 1, wherein
  a) the aliphatic polyester is polybutylene succinate, the aliphatic dicarboxylic acid is succinic acid, the aliphatic alcohol is 1,4-butanediol and the diester is bis(4-hydroxybutyl)butanedioate, or
  b) the aliphatic polyester is polyethylene succinate, the aliphatic dicarboxylic acid is succinic acid, the aliphatic alcohol is ethylene glycol and the diester is bis(4-hydroxyethyl)butanedioate.

17. The method according to claim 1, wherein the esterification product is produced by condensation of the at least one aliphatic dicarboxylic acid and acid anhydrides derived therefrom with 2 to 12 carbon atoms with the at least one aliphatic alcohol with 2 to 12 carbon atoms and at least two hydroxyl functionalities.

18. The method according to claim 1, wherein, in the production of the esterification product, the stoichiometric ratio of the totality of the at least one dicarboxylic acid with 2 to 12 carbon atoms and/or acid anhydrides derived therefrom to the totality of the at least one aliphatic alcohol with 2 to 12 carbon atoms is of 1:0.5 to 1:5.0.

* * * * *